United States Patent
Cho et al.

(10) Patent No.: US 10,039,134 B2
(45) Date of Patent: Jul. 31, 2018

(54) METHOD AND APPARATUS FOR RANDOM ACCESS IN WIRELESS COMMUNICATION SYSTEM

(71) Applicant: ELECTRONICS AND TELECOMMUNICATIONS RESEARCH INSTITUTE, Daejeon (KR)

(72) Inventors: Seungkwon Cho, Daejeon (KR); Anseok Lee, Daejeon (KR); Soojung Jung, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 75 days.

(21) Appl. No.: 14/940,855

(22) Filed: Nov. 13, 2015

(65) Prior Publication Data

US 2016/0143064 A1    May 19, 2016

(30) Foreign Application Priority Data

Nov. 14, 2014   (KR) .................. 10-2014-0159203
Nov. 12, 2015   (KR) .................. 10-2015-0159224

(51) Int. Cl.
*H04W 74/06*       (2009.01)
*H04W 72/04*       (2009.01)
(Continued)

(52) U.S. Cl.
CPC ..... *H04W 74/0858* (2013.01); *H04W 76/027* (2013.01); *H04W 76/18* (2018.02); *H04W 74/004* (2013.01)

(58) Field of Classification Search
CPC ................. H04W 74/0858; H04W 76/027
See application file for complete search history.

(56) References Cited

U.S. PATENT DOCUMENTS

2010/0136987 A1    6/2010  Kim et al.
2012/0314668 A1   12/2012  Yeo et al.
(Continued)

FOREIGN PATENT DOCUMENTS

KR    10-2013-0093656 A    8/2013
KR    10-2013-0121996 A   11/2013

OTHER PUBLICATIONS

Zhou, Dynamic Resource Allocation for Machine-Type Communications in LTE/LTE-A with Contention-Based Access, 2013 IEEE Wireless Communications and Networking Conference (WCNC); Date of Conference: Apr. 7-10, 2013.*

(Continued)

*Primary Examiner* — Yemane Mesfin
*Assistant Examiner* — Henry Baron
(74) *Attorney, Agent, or Firm* — Rabin & Berdo, P.C.

(57) ABSTRACT

Disclosed is a method and apparatus for random access in a wireless communication system. In a communication environment in which a first terminal and a second terminal coexist, a base station receives a random access identification signal from one among a first terminal and a second terminal. The base station transmits a busy signal in response to the random access identification signal. After that, the base station receives data from the terminal having transmitted the random access identification signal.

19 Claims, 7 Drawing Sheets

(51) Int. Cl.
*H04W 74/04* (2009.01)
*H04W 74/00* (2009.01)
*H04W 76/02* (2009.01)
*H04W 74/08* (2009.01)
*H04W 76/18* (2018.01)

(56) References Cited

U.S. PATENT DOCUMENTS

| | | |
|---|---|---|
| 2013/0028224 A1* | 1/2013 | Chen .................. H04W 76/02 370/329 |
| 2013/0058315 A1* | 3/2013 | Feuersanger ....... H04W 52/281 370/336 |
| 2013/0242735 A1 | 9/2013 | Koc et al. |
| 2013/0265942 A1 | 10/2013 | Lu et al. |
| 2014/0321391 A1 | 10/2014 | Zhang et al. |

OTHER PUBLICATIONS

Kaijie Zhou, et al., "Dynamic Resource Allocation for Machine-Type Communications in LTE/LTE-A with Contention-Based Access", 2013 IEEE Wireless Communications and Networking Conference (WCNC): MAC.

"Technology-leading 5G R&D Status", 2015, Electronics and Telecommunications Research Institute, Communication & Internet Research Laboratory, Wireless transmission research department, 5G Open Symposium 2015, p. 20.

Seungkwon Cho, et al., "Low-latency Technologies with Consideration of Short TTI", 2015, Electronics and Telecommunications Research Institute, English abstract.

* cited by examiner

METHOD AND APPARATUS FOR RANDOM ACCESS IN WIRELESS COMMUNICATION SYSTEM

CROSS-REFERENCE TO RELATED APPLICATION

This application claims priority to and the benefit of Korean Patent Application Nos. 10-2014-0159203 and 10-2015-0159224 filed in the Korean Intellectual Property Office on Nov. 14, 2014 and Nov. 12, 2015, the entire contents of which are incorporated herein by reference.

BACKGROUND OF THE INVENTION (a) Field of the Invention

The present invention relates to a method and apparatus for random access in a wireless communication system.

(b) Description of the Related Art

In a wireless system, when each terminal wants to transmit data by random access of a distributed scheduling method, a process having a plurality of steps (e.g. 5 steps) is performed. The method for transmitting data through the plurality of steps has a drawback of a large delay time. Also, to go to the next step from each step, a process for receiving and analyzing a signal and transmitting a response signal has to be performed more than once at a terminal and a base station, respectively. However, the process requires the intervention of a medium access control (MAC) layer, and thereby it takes a significant time to complete the process.

The large delay time in the random access has a fundamental limitation in supporting a new service of emerging importance in a next mobile communication system such as a low latency service that may be featured with sporadic uplink transmissions, but a short delay time is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for random access having advantages of reducing access latency.

An exemplary embodiment of the present invention provides a method for random access by a terminal in a wireless communication system. The method includes: transmitting, by the terminal, a random access identification signal representing that the terminal tries random access to the wireless communication system, to a base station; and transmitting, by the terminal, data after transmitting the random access identification signal, wherein the random access identification signal includes a different identification code from other terminals to try random access.

The random access identification signal may be orthogonal with random access identification signals transmitted from other terminals to try random access.

The terminal may be provided with the identification code from the base station through signal exchange.

The terminal may acquire information on the CB RA resource through at least one among a method for acquiring the information through signal exchange with the base station and a method for acquiring the information from system information broadcasted from the base station.

After the transmitting data, the method may further include determining that the random access has failed when an uplink resource allocation signal for new transmission or retransmission is not received from the base station during a predetermined time and trying retransmitting data.

Another exemplary embodiment of the present invention provides a method for random access in a wireless communication system. The method includes: receiving, by a base station, a random access identification signal representing that a first terminal tries random access from the first terminal in a communication environment in which the first terminal and a second terminal coexist; transmitting, by the base station, a busy signal in responsive to the random access identification signal; and receiving, by the base station, data from the first terminal.

The first terminal may be a terminal that tries to access with a contention-based random access (CB RA) method, the second terminal may be a terminal that tries to access with a contention-free access (CFA) method, and the busy signal may represent that a following radio resource will be used as a resource for CB RA.

Before the receiving of a random access identification signal, the method may further include performing, at a first time, scheduling for granting a CB RA radio resource that is a part of uplink resources at a second time after a predetermined interval has elapsed from the first time so that the first terminal and the second terminal share the CB RA radio resource.

After the receiving of a random access identification signal, the method may further include decoding the random access identification signal to acquire an identification code of the first terminal.

After the receiving of data, the method may further include identifying each of the first terminals based on identification codes, and allocating a resource to each of the first terminals with the CFA method if collision occurs when receiving data from two or more first terminals.

The method may further include performing new transmission resource allocation or retransmission resource allocation according to whether the random access identification signal and the data are received.

Here, the performing of new transmission resource allocation or retransmission resource allocation may include: allocating a new transmission uplink resource to inform of data reception success to the first terminal that is identified based on the identification code when all of the identification signal and the data are successfully received; and allocating a retransmission uplink resource to inform of data reception failure to the first terminal that is identified based on the identification code when the identification signal is successfully received and the reception of the data has failed.

The method may further include informing a terminal of whether data is successfully received by using a flag representing that an allocated uplink resource is for the new transmission resource allocation or the retransmission resource allocation.

The informing may inform whether data is successfully received by using a new data indicator (NDI) flag.

The informing may include informing of whether data is successfully received within a predetermined time, wherein the predetermined time represents a time period defined as a rescheduling window.

Yet another exemplary embodiment of the present invention provides an apparatus for processing random access in a wireless communication system. The apparatus includes: a wireless frequency converter configured to transmit/receive a signal through an antenna; and a processor connected to the wireless frequency converter and configured to process random access, wherein the processor includes: an identification signal processor that receives a random access identification signal representing that a first terminal tries random access from the first terminal in a communication environment in which the first terminal and a second terminal coexist and acquires an identification code; a busy signal transmission processor that transmits a busy signal in responsive to the random access identification signal; and a data reception processor that receives data from the first terminal.

The processor may further include a first scheduling processor that performs, at a first time, scheduling for granting a CB RA radio resource that is a part of uplink resources at a second time after a predetermined interval has elapsed from the first time so that the first terminal and the second terminal share the CB RA radio resource.

The processor may further include a second scheduling processor that identifies each of first terminals based on identification codes and allocates a resource to each of the first terminals with the CFA method if collision occurs when receiving data from two or more first terminals.

The processor may further include a third scheduling processor that performs new transmission resource allocation or retransmission resource allocation according to whether the random access identification signal and the data are received.

Here, the third scheduling processor may inform whether data is successfully received by using a flag representing that an allocated resource is for the new transmission resource allocation or the retransmission resource allocation.

DETAILED DESCRIPTION OF THE EMBODIMENTS

Figure 1:
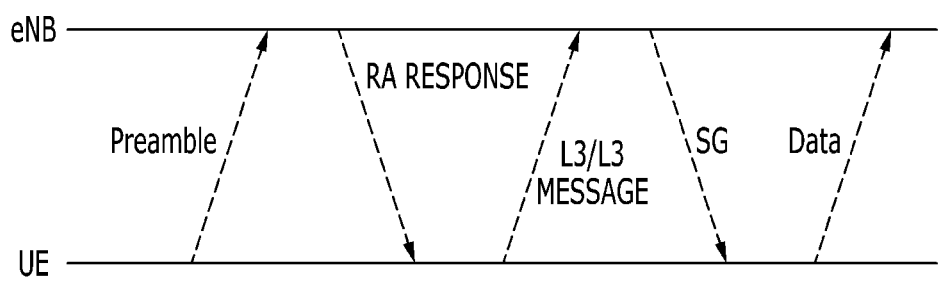
FIG. 1 shows a random access in a wireless communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, unless explicitly described to the contrary, the word "comprise" and variations such as "comprises" or "comprising" will be understood to imply the inclusion of stated elements but not the exclusion of any other elements.

In this specification, a terminal may designate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include the entire or partial functions of the MT, the MS, the AMS, the HR-MS, the SS, the PSS, the AT, the UE, etc.

A base station (BS) may designate an advanced base station (ABS), a high reliability base station (HR-BS), a node B (nodeB), an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (HR-RS) serving as a base station, a high reliability relay station (HR-RS) serving as a base station, a small base station (a femto BS, a home node B (HNB), a home eNodeB (HeNB), a pico BS, a metro BS, a micro BS, etc.), etc., and may include all or some functions of the ABS, the nodeB, the eNodeB, the AP, the RAS, the BTS, the MMR-BS, the RS, the RN, the ARS, the HR-RS, the small base station, etc.

Hereinafter, a method and apparatus for random access in a wireless communication system according to an exemplary embodiment of the present invention will be described.

FIG. 1 shows random access (referred to as RA) in a wireless communication system.

In a wireless communication system such as a long term evolution (LTE) system, a terminal to try RA, as shown in FIG. 1, first transmits a preamble signal for RA (or an orthogonal signal, an orthogonal sequence, or an orthogonal signature) in an RA area (may be a physical random access channel (PRACH) in LTE). The preamble signal has orthogonality, thereby it can be received by a base station if each preamble signal is different from the others even though a plurality of terminals transmit preamble signals with the same radio resource.

The base station (may be referred to as eNB) having received the preamble signal transmits an RA response signal in responsive to the preamble signal to the terminal. The terminal receives the RA response signal and transmits a Layer-2/Layer-3 (L2/L3) message to the base station. As this time, the terminal adds the quantity of uplink resources to be needed to a buffer status report (BSR) message and transmits it with the L2/L3 message so as to request uplink resources.

The base station performs scheduling to allocate an uplink resource to the terminal and transmits information on the allocated uplink resources through a scheduling grant (SG) (e.g., a format 0 in downlink control information (DCI) of a physical downlink control channel (PDCCH) is used). The terminal transmits data by using the uplink resource allocated through the SG from the base station.

When performing random access in the wireless communication system as above, all the five steps in FIG. 1 have to be performed for the terminal to transmit uplink data even though uplink synchronization has been acquired. Accordingly, delay caused by data transmission occurs. Further, a process for receiving and analyzing a signal and then transmitting a response is performed two times at a terminal and a base station, respectively. Determining at a MAC layer is needed when performing the process, thereby it takes considerable processing time. In consideration of the processing time, a delay time of about 20 ms occurs for data transmission.

Meanwhile, compared with a contention-free (CF) scheduling method in which each terminal receives resource allocation by centralized scheduling of a base station without collisions with other terminals, a contention-based random access (CB RA) method in which each terminal performs distributed random access does not guarantee exclusive use of a radio resource. Accordingly, there is possibility that the data transmitted from a terminal may collide with the data transmitted from another terminal. Therefore, a method for avoiding collision or reducing collision probability is needed.

In an RA method, each terminal selects one among a K number of orthogonal preambles and then transmits it to a base station before transmitting data so as to reduce collision probability. The number of orthogonal preambles is finite (K number), thereby there is still a collision probability. In order to solve this, before data transmission, messages for resolving collision are transmitted/received and then data is finally transmitted. This method has an advantage of resolving collision in the step of transmitting data, but it is disadvantageous in that it takes time to go through the step and then delay time is greatly increased. Since the data transmission delay time is increased, particularly, a power-constrained terminal being powered by battery and transmitting short data sporadically has a fatal drawback of increasing power consumption.

In an exemplary embodiment of the present invention, when transmitting data according to contention-based random access (CB RA), RA for reducing delay time until data transmission is performed.

For this purpose, in an exemplary embodiment of the present invention, the RA is performed through shorter steps than in an RA method spanning five steps, such that data collision is avoided or collision probability is reduced as much as possible.

The RA according to an exemplary embodiment of the present invention performs orthogonal identification signal transmission, busy signal confirmation, and data transmission.

In an exemplary embodiment of the present invention, the resources used in CB RA are parts of the uplink resources of a system. A base station may broadcast information on CB RA resources as system information, or provide it to a terminal that wants to perform RA with a CB RA method (the terminal will be referred to as a CB RA terminal for convenience) in a manner of one-to-one signal exchange. Through the above, the base station may provide the same information on CB RA resources to a plurality of terminals.

Specifically, the base station broadcasts information on CB RA resources as system information. For example, in a case of a mobile worldwide interoperability for microwave access (WiMAX) system, the information on CB RA resources as system information is broadcasted as a part of uplink channel descriptor (UCD) information or it is broadcasted as a part of system information block (SIB) in a long term evolution (LTE) system so that a plurality of CB RA terminals share the same CB RA resource information.

Also, the base station provides the same CB RA resource information to the plurality of CB RA terminals through signal exchange with a CB RA terminal. For example, the base station may provide CB RA resource information to a terminal one-to-one by using a radio resource control (RRC) control message in an LTE system so that the same CB RA resource information may be provided to the plurality of terminals. Accordingly, the plurality of CB RA terminals may share the CB RA resource information.

Meanwhile, in a case in which the base station provides the CB RA resource information to the plurality of the CB RA terminals through one-to-one signal exchange, CB RA resources may be allocated by various scheduling. For example, CB RA resources may be allocated according to persistent scheduling in a mobile WiMAX system and may be allocated according to semi-persistent scheduling (SPS) in an LTE system.

A terminal that tries to access with a CB RA method according to an exemplary embodiment of the present invention, that is, a CB RA terminal, may use exclusively dedicated resources for CB RA. In this case, the CB RA resources are dedicated for CB RA and utilized for only CB RA terminals. Those dedicated CB RA resources cannot be shared with other terminals that perform CFA.

Meanwhile, when the CB RA resources are not much used since the load of the CB RA on the CB RA resources is low, that is, when the CB RA resources are underutilized, it may result in reduced system capacity from the entire system point of view. In consideration of the above, according to an exemplary embodiment of the present invention, a CFA method and a CB RA method may share the same CB RA resources to improve resource utilization.

Also, to avoid collision caused by the resource sharing between the CFA method and the CB RA method, an identification signal is transmitted before the time of data transmission. The identification signal is a physical-layer (PHY)-decodable signal of which contents are decoded at a physical layer and has a different value for each terminal trying to RA according to an exemplary embodiment of the present invention. The value of the identification signal may be a medium access control (MAC) address, a cell-radio network temporary identity (C-RNTI), or information on a code value when a terminal uses code division multiplexing (CDM) for data transmission.

Each identification signal used in each terminal has an orthogonal characteristic. Even though identification signals that are transmitted through the same resources from terminals trying to RA are overlapped and received by a base station, they may be divided and decoded correctly due to the orthogonality. When successfully receiving the identification signal, the base station may identify a terminal trying to CB RA.

The identification signal enables identification of a CB RA terminal, and its physical specifications may be various. Also, the CB RA terminals may have a different identification code from each other. The CB RA terminal may be provided with an identification code different from other terminals through one-to-one signal exchange and transmit an identification signal including the identification code to a base station. Here, for example, the base station may secure a list of CB RA terminals in advance and allocate an identification code different from codes of the list to a CB RA terminal.

Meanwhile, when receiving an identification signal transmitted from a terminal trying to CB RA, the base station broadcasts a busy signal indicating that radio resources for CB RA data transmission will be used. The busy signal indicates that a subsequent radio resource will be used for CB RA data transmission. The detailed description on the above will be given later.

The base station may separate identification signals, which may be overlapped and received, into individual ones to decode and broadcast a busy signal if the decoding is successful in any of the identification signals or broadcast a busy signal even if the decoding has failed in all of the received identification signals. The present invention is not restricted thereto, and for example, all of the above busy signal broadcasting manners may be used. Also, the base station may broadcast a busy signal when the power or energy of the receive identification signal is greater than a predetermined level even though the decoding is not successful in the identification signals.

The identification signal and the busy signal according to an exemplary embodiment of the present invention are used for avoiding collision between a terminal trying the CB RA, that is, contention-based access (CBA), and a terminal trying the CFA with the same resource or reducing the collision probability. Hereinafter, for better comprehension and ease of description, the collision between a terminal trying the CB RA and a terminal trying the CFA with the same resource will also be referred to as "collision between the CB RA and the CFA".

Figure 2:
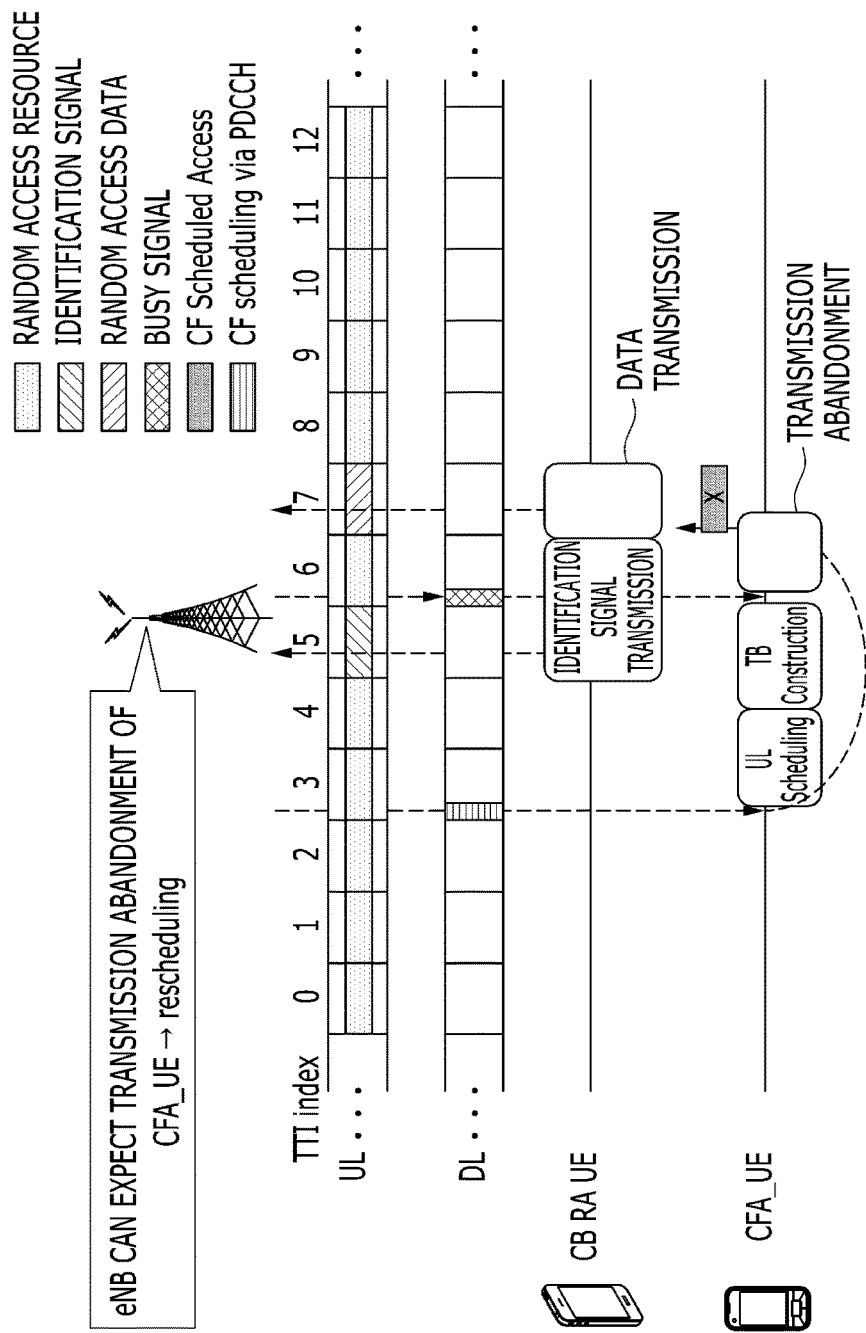
FIG. 2 shows a process for avoiding the collision between the CB RA and the CFA according to an exemplary embodiment of the present invention.

FIG. 2 shows a process for avoiding the collision between the CB RA and the CFA according to an exemplary embodiment of the present invention.

In FIG. 2, a time interval until a base station transmits a busy signal in response to an identification signal from a terminal is represented as 1 transmission time interval (TTI), but it is not restricted thereto. The present invention may be applied to the case in which the time interval is an integer (0) multiple of TTI. For convenience of explanation hereinafter, it is assumed that the time interval is "1 TTI". Likewise, when scheduling is performed on a CFA terminal with CB RA resources, the time relevance between the grant delivered through a control channel and the granted CFA resources is represented as "4 TTI", but this is for convenience of explanation and the present invention is not restricted thereto.

In FIG. 2, the horizontal axis represents a time axis of TTI units and the movement from the left side to the right side in FIG. 2 represents the passage of the time of TTI units. UL and DL represent uplink and downlink in a frequency division duplexing (FDD) structure, respectively, but the present invention is not restricted thereto and may be applied to a time division duplexing (TDD) structure. A CB_RA_UE represent a terminal to transmit data in uplink with a CB RA method and a CFA_UE represents a terminal to transmit data in uplink with a CFA method.

Figure 3:
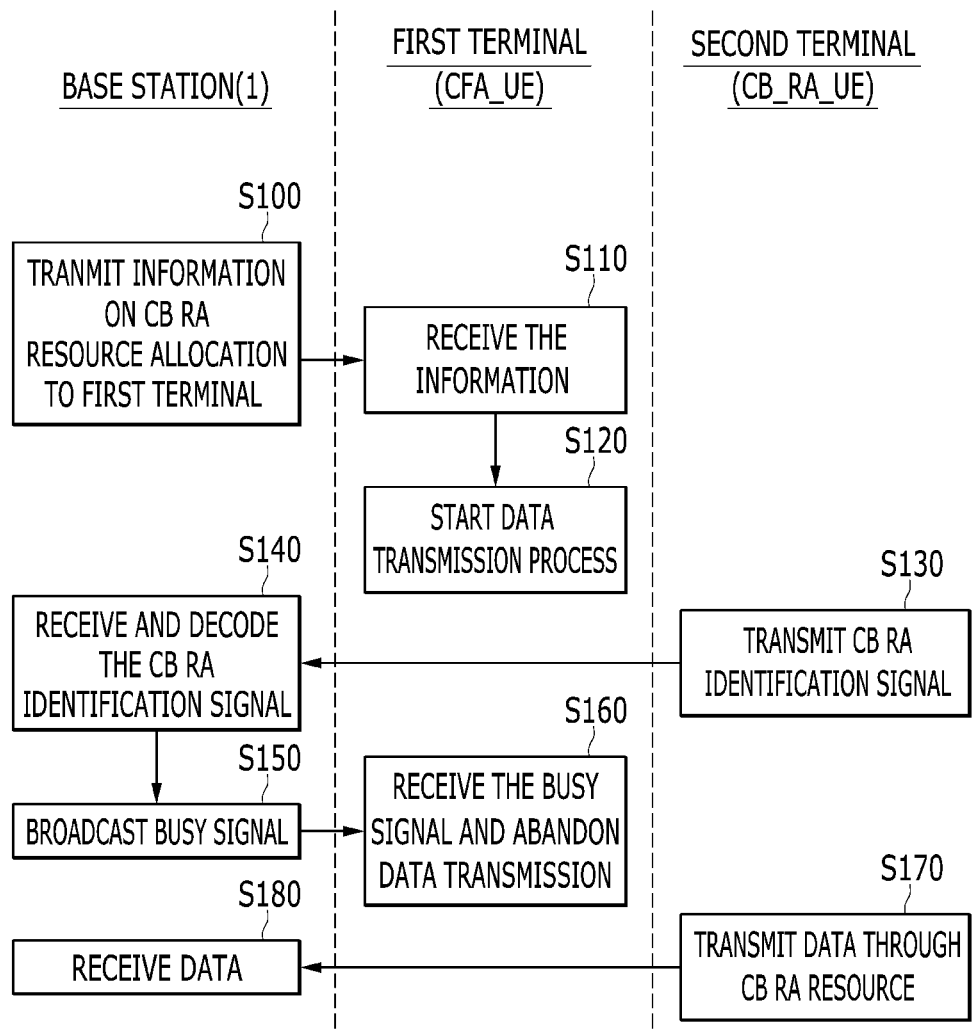
FIG. 3 shows a flowchart of a method for random access according to a first exemplary embodiment of the present invention.

Referring to FIG. 2 and FIG. 3, an RA method according to an exemplary embodiment of the present invention will be described based on the passage of the time of the TTI unit.

FIG. 3 shows a flowchart of an RA method according to a first exemplary embodiment of the present invention.

Here, a first terminal is a terminal to transmit data with the CFA method and a second terminal is a terminal to transmit data with the CB RA method.

As shown in FIG. 2 and FIG. 3, at a time TTI#3, a base station 1 performs scheduling for granting resources to the first terminal (CFA_UE) and transmits uplink resource allocation information (UL grant) through a control channel (S100). The uplink CB RA resource is a resource for terminals that try to transmit data with the CB RA method. To improve resource efficiency of the CB RA resource, the base station may grant the CB RA resource to the first terminal (CFA_UE). The first terminal (CFA_UE) may not actually use the CB RA resource. Accordingly, the CB RA resource granted as above may be suitable for low priority traffic that is delay tolerant.

The first terminal (CFA_UE) having received the uplink resource allocation information (UL grant) through the control channel starts to process data transmission based on its uplink scheduling so as to transmit data at a corresponding resource, that is, at TTI#7. The first terminal (CFA_UE) performs a process such as a process for constructing data in a format of an uplink transport block (UL TB) (S110 and S120).

Meanwhile, at a time (e.g., TTI#5), the second terminal (CB_RA_UE) transmits a CB RA identification signal to perform CB RA (S130). Here, it is assumed that the second terminal (CB_RA_UE) starts a process for transmitting data through the CB RA at the time TTI#5.

The base station 1 receives the CB RA identification signal and decodes the terminal's identification information embedded in the CB RA identification signal (S140). At a time TTI#(5+N) (here, N>0) after a predetermined time, the decoding of the terminal's identification information (e.g., an identification code) may have been completed. The base station 1 may store the decoded terminal's identification information. The base station 1 stores the decoded terminal's identification information so that the second terminal (CB_RA_UE) performs data retransmission with the CFA method when collision or reception error occurs at a time (e.g., at TTI#7).

Meanwhile, at a time TTI#6, the base station 1 broadcasts a busy signal in response to the CB RA identification signal received at the time TTI#5 (S150).

The first terminal (CFA_UE) receives the busy signal broadcasted in downlink and abandons data transmission (S160). At this time, even just before start transmitting data since UL TB construction is completed, the first terminal (CFA_UE) abandons data transmission according to the busy signal. Meanwhile, the second terminal (CB_RA_UE) having transmitted the CB RA identification signal does not monitor a busy signal.

After this, at a time TTI#7, the second terminal (CB_RA_UE) transmits data with the CB RA method (S170). The base station 1 receives the data from the second terminal (CB_RA_UE) without collision (S180). That is, since the first terminal (CFA_UE) has abandoned data transmission according to the busy signal, it is possible to receive data from the second terminal (CB_RA_UE) without collision.

As above, it is possible to avoid the collision between the CB RA and the CFA according to the busy signal transmitted in downlink.

Also, it is possible to resolve resource underutilization caused by the case of a low contention-based access load when only terminals using a contention-based access method use the radio resources exclusively. The resource efficiency of the CB RA resource is improved with the help of sharing of the resource between CBA and CFA.

As above, the base station 1, as shown in FIG. 2, transmits the busy signal at the next time (TT#6) as soon as the CB RA identification signal is received at the time (TTI#5), but the present invention is not restricted thereto.

Next, an RA method according to the second exemplary embodiment of the present invention will be described.

In the second exemplary embodiment of the present invention, a method capable of reducing collision between CB RA terminals as well as collision between a CB RA terminal trying the CB RA method and a CFA RA terminal trying the CFA method is provided.

Figure 4:
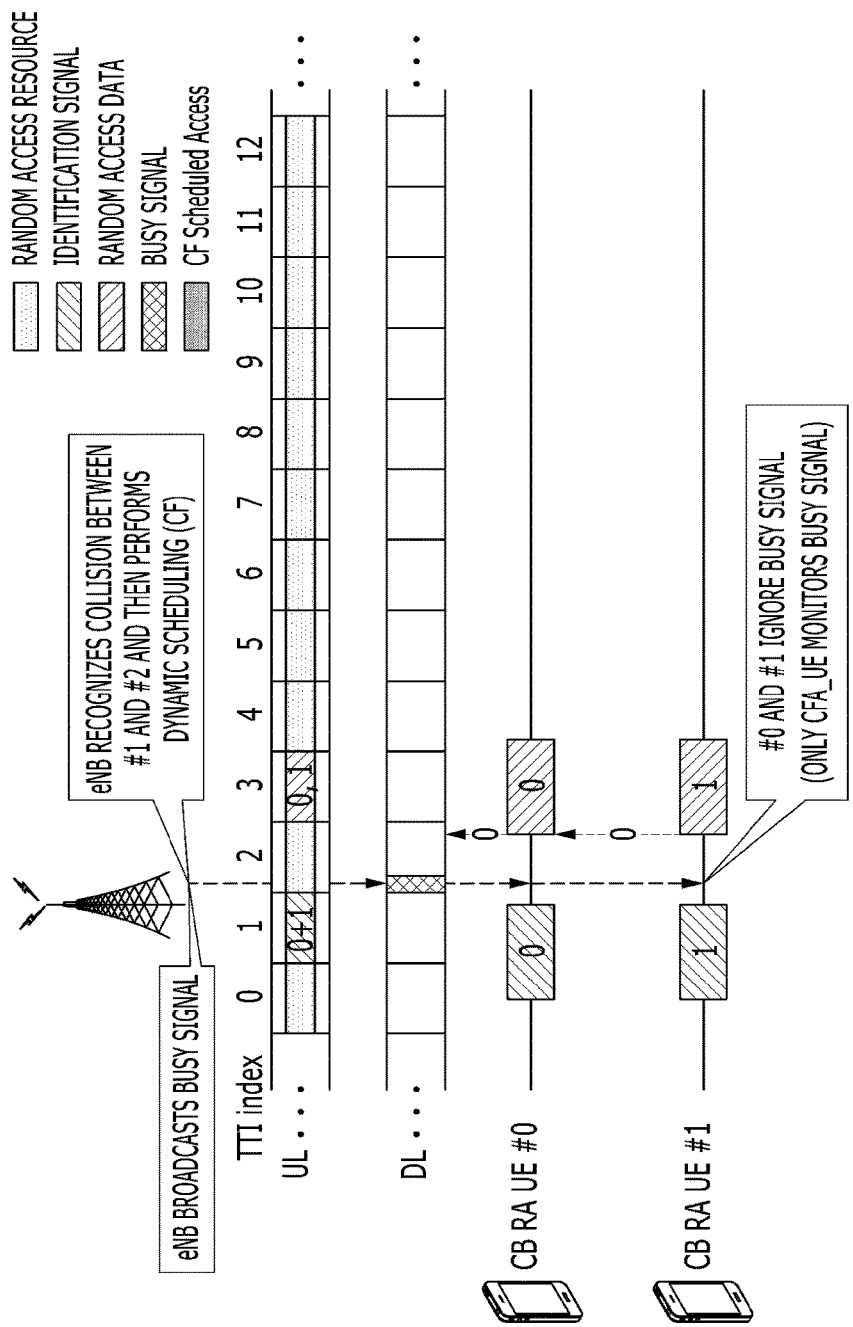
FIG. 4 shows a timing diagram of a method for random access according to a second exemplary embodiment of the present invention.
Figure 5:
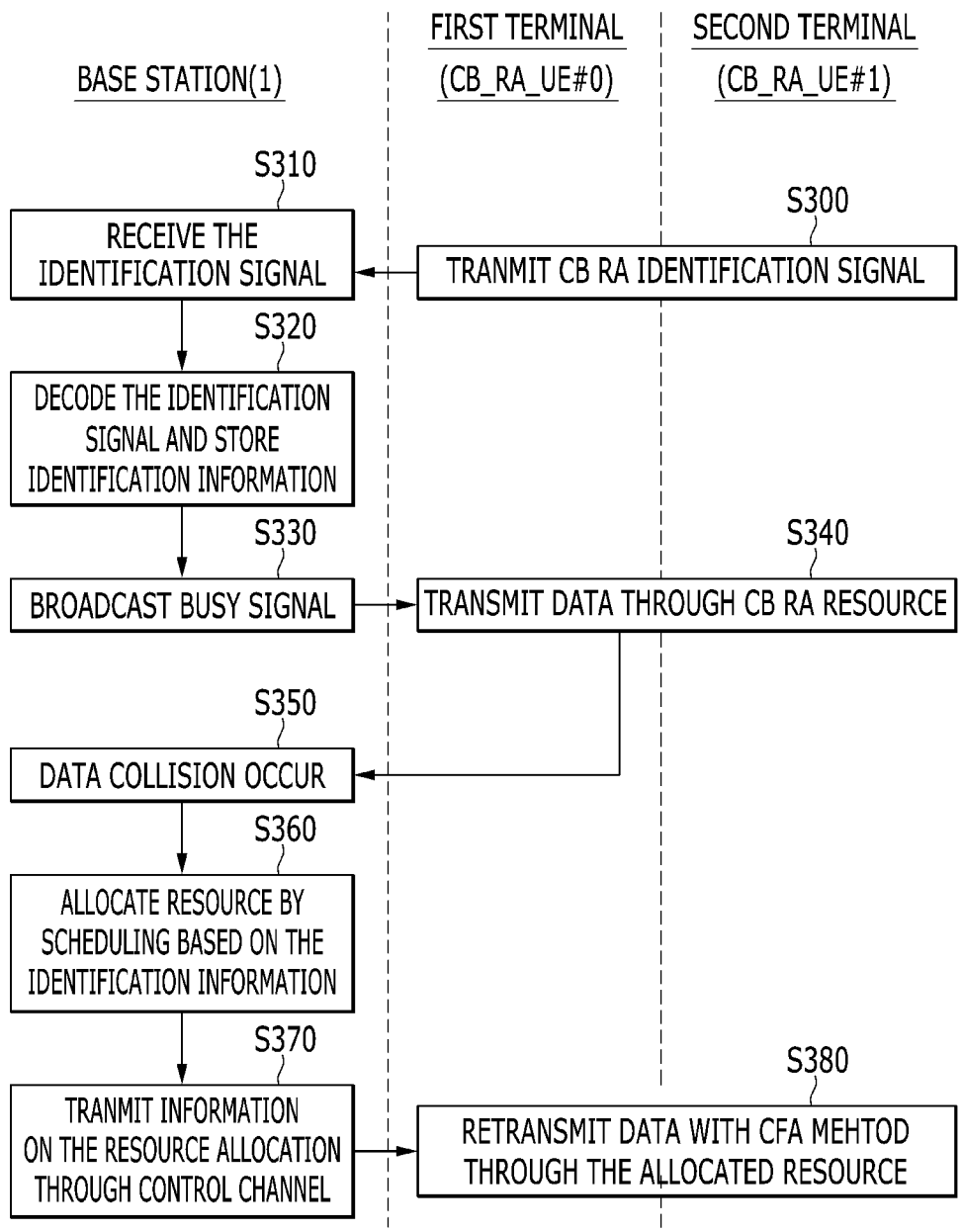
FIG. 5 shows a flowchart of a method for random access according to a second exemplary embodiment of the present invention.

FIG. 4 shows a timing diagram of a method for random access according to a second exemplary embodiment of the present invention, and FIG. 5 shows a flowchart of a method for random access according to a second exemplary embodiment of the present invention.

As shown in FIG. 4 and FIG. 5, at a time TTI#1, a first terminal (CB_RA_UE#0) and a second terminal (CB_RA_UE#1) transmit CB RA identification signals, respectively, thereby a CB RA process begins (S300). Here, the first and second terminals are terminals to transmit data with the CB RA method.

The base station 1 receives the CB RA identification signals (S310). The CB RA identification signals from the first and second terminals (CB_RA_UE#0, CB_RA_UE#1) are orthogonal to each other such that the base station 1 may decode the identification signals, respectively. The base station 1 starts decoding terminal's identification information embedded in the CB RA identification signals, and completes the decoding of each identification information of the first and second terminals (CB_RA_UE#0, CB_RA_UE#1) at a time TTI#(1+N). The decoded identification information of the first and second terminals (CB_RA_UE#0, CB_RA_UE#1) may be stored so as to retransmit CB RA data with the CFA method when the base station 1 fails in receiving data because collision between data transmitted from the first and second terminals (CB_RA_UE#0, CB_RA_UE#1) at a time TTI#3 occurs or for other reasons. The identification information may include a unique identifier (e.g., C-RNTI) of a terminal in a cell or an identifier mapping the unique identifier (S320).

After this, at a time TTI#2, the base station 1 broadcasts a busy signal in response to the CB RA identification signal in downlink (S330). At this time, the first and second terminals (CB_RA_UE#0, CB_RA_UE#1) having transmitted the CB RA identification signals do not monitor the busy signal.

Accordingly, at a time TTI#3, if the first and second terminals (CB_RA_UE#0, CB_RA_UE#1) transmit CB RA data, respectively (S340), data collision occurs, thereby the base station 1 fails in receiving the data.

If the collision between data from the first and second terminals (CB_RA_UE#0, CB_RA_UE#1) occurs (S350), the base station 1 allocates individually resources to the first and second terminals (CB_RA_UE#0, CB_RA_UE#1) with the CFA method based on the stored identification information so that they can perform CF access. That is, if collision between received data occurs, at a time TTI# (1+N+M) (here, N≥0, M>0), based on the identification information (e.g., a unique identifier of a terminal in a cell (C-RNTI) or an identifier mapping to the unique identifier) that is decoded and stored at a time TTI# (1+N) after being received at a prior time TTI#1, the base station 1 allocates resources to each of the first and second terminals (CB_RA_UE#0, CB_RA_UE#1) to which data collision occurs according to the CFA method and transmits information on the allocated resources to the first and second terminals (CB_RA_UE#0, CB_RA_UE#1) through control channels, respectively (S360). Accordingly, the first and second terminals (CB_RA_UE#0, CB_RA_UE#1) can perform CF access (S370).

Therefore, even though data transmission has failed due to the collision between data from the first and second terminals (CB_RA_UE#0, CB_RA_UE#1) in initial transmission at a time TTI#3, they may retransmit data based on the resources allocated with the CFA method, and thereby, it is capable of data transmission without collision.

In the second exemplary embodiment of the present invention, the CB RA identification signal transmitted at the time TTI#1 has a function of reserving resources for the CB RA from CFA terminals and plays a role of implicitly requesting resource for retransmission in advance.

Meanwhile, when failing in receiving CB RA data, the base station performs scheduling with the CFA method. As a result, collision caused by the case in which terminals try to perform CB RA again when retransmitting data may be reduced, and thereby overall delay time may be reduced. Also, resources (which may mean resources used in the case in which data collision occurs) for retransmission are requested in advance in the initial data transmission with the CB RA method, and thereby it is possible to reduce delay time compared with the case in which resources for retransmission are requested after collision occurs.

In addition, in the second exemplary embodiment of the present invention, the base station fails in receiving data when the CB RA data from the first and second terminals (CB_RA_UE#0, CB_RA_UE#1) are transmitted through the same radio resource within the same TTI, but the present invention is not restricted thereto and the case in which each terminal transmit data by using CDM may be included in the present invention.

That is, in the step (S340), when the first and second terminals (CB_RA_UE#0, CB_RA_UE#1) transmit data by using the CDM, the base station may decode each data without failure caused by data collision. Specifically, the CB RA identification signal may include information on a code value used in data transmission, and the base station may recognize which terminal tries to transmit data through CB RA resources subsequent to the identification signal based on the CB RA identification signal. After that, if each terminal transmits data by using the CDM, the base station may successfully receive data because of already knowing the code value of the CDM even though the data from the terminals are overlapped.

Further, in the exemplary embodiments, transmitting an additional signal at the TTI at which the identification signal is transmitted is not described, but the present invention includes the case in which a CB RA terminal transmits an additional signal such as a scheduling request signal, in addition to the identification signal. The scheduling request signal may be a signal for requesting scheduling to uplink, for example, a bandwidth request (BR) code in the mobile WiMAX system or a scheduling request (SR) signal in the LTE system.

In addition, in the exemplary embodiments, transmitting an additional message in addition to data transmission at the TTI in which the CB RA data is transmitted is not described, but the present invention may include the case in which a CB RA terminal further transmits a signal or a message for requesting uplink radio resource allocation with data, in addition to data transmission. The signal or message for requesting uplink radio resource allocation may include a bandwidth request (BR) header in the mobile WiMAX system or a buffer status report (BSR) in the LTE system.

Next, the operation of the base station according to an exemplary embodiment of the present invention will be described.

In an exemplary embodiment of the present invention, according to whether the identification signal and data from the CB RA terminal is successfully received, the base station performs resource allocation as in the following Table 1.

TABLE 1

| Whether identification signal is received | Whether data is received | |
|---|---|---|
| | Success | Failure |
| Success | Uplink resource allocation for new transmission (A) | Uplink resource allocation for retransmission (B) |
| Failure | Discarding received data (C) | No action (NA) (D) |

Figure 6:
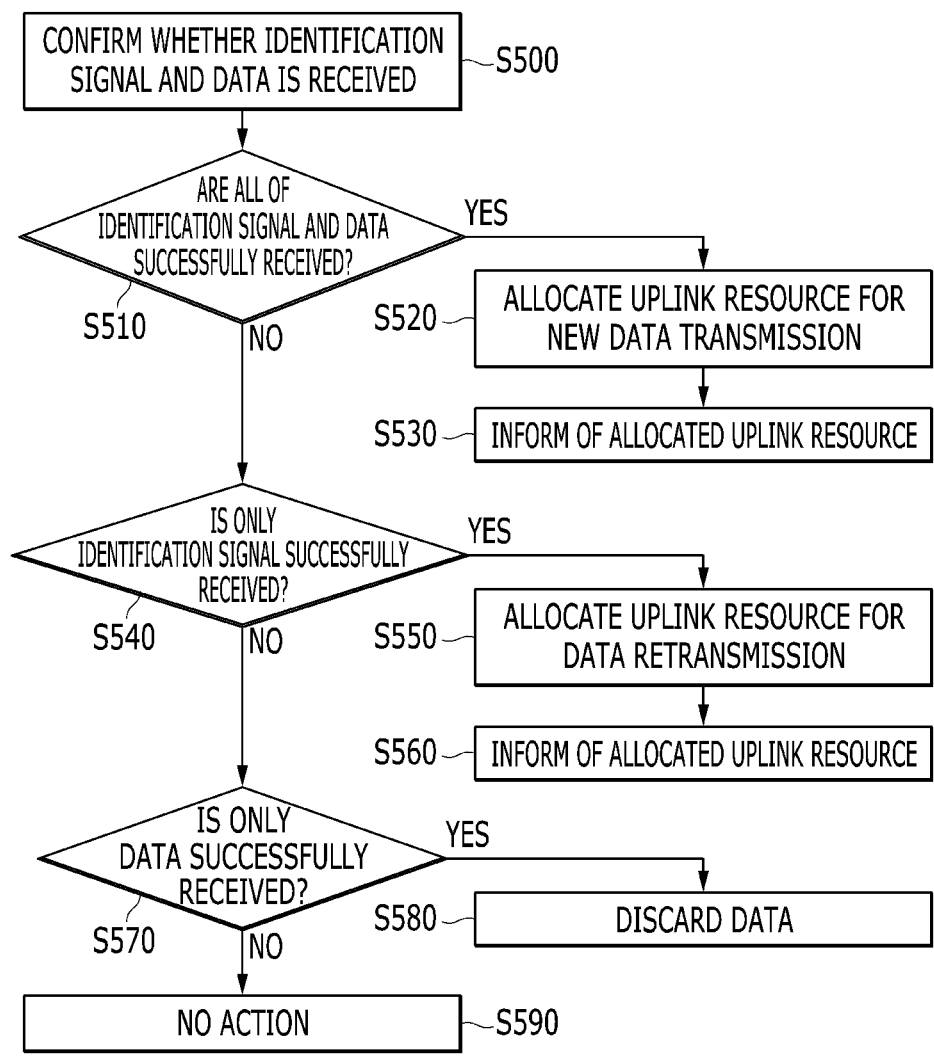
FIG. 6 shows a flowchart of a resource allocation process based on whether an identification signal and data transmitted from a CB RA terminal are received according to an exemplary embodiment of the present invention.

FIG. 6 shows a flowchart of a resource allocation process based on whether an identification signal and data transmitted from a CB RA terminal are received according to an exemplary embodiment of the present invention.

In an exemplary embodiment of the present invention, the base station performs, as shown in FIG. 6, resource allocation according to whether the identification signal and data from the CB RA terminal are successfully received (S500).

As in Table 1, when all of the identification signal and data transmitted from the CB RA terminals are successfully received (A), the base station can identify a transmission terminal having transmitted the identification signal and the data, and then allocate an uplink resource for new data transmission to inform the identified transmission terminal of the successful data reception (S510 and S520). At this time, the base station allocates a resource with a size of 0 when there is no uplink band request signal such as the BSR of the LTE system in the received data. On the other hand, the base station allocates a resource of a non-zero size when there is an uplink band request signal such as the BSR of the LTE system in the received data. Then, the base station informs the transmission terminal of information on the allocated resource (S530). For example, in the LTE system, the base station transmits uplink grant of new data indicator (NDI)=1 through a physical downlink control channel (PDCCH).

Meanwhile, when the identification signal from a CB RA terminal is successfully received and the reception of the data from a CB RA terminal has failed (B), the base station can identify a transmission terminal having transmitted the identification signal and then allocate an uplink resource for data retransmission to inform the identified transmission terminal of the failure of data reception (S540 and S550). At this time, the base station may allocate an uplink resource for data retransmission having the same size as the CB RA resource. Also, the base station may determine the size of the uplink resource for data retransmission based on the adjustable size according to the operation/management policy of the base station adjustable, in consideration of the size of the available uplink resources. The base station informs the transmission terminal of information on the allocated resource (S560). For example, in the LTE system, the base station transmits uplink grant of new data indicator (NDI)=0 through a PDCCH.

Meanwhile, when the reception of the identification signal from a CB RA terminal has failed and the reception of the data from a CB RA terminal is successfully received (C), the base station cannot identify a transmission terminal having transmitted the data even though the data is successfully received. Accordingly, the base station discards the data (S570 and S580).

Also, when the reception of all of the identification signal and data from a CB RA terminal has failed (D), the base station does not perform an action (S590).

Meanwhile, the CB RA terminal that has finished data transmission by performing a CB RA process waits for a signal related to uplink resource allocation for new transmission or retransmission from the base station during a predetermined time after data transmission. Here, the predetermined time represents a time period of a TTI unit defined as a rescheduling window.

The base station, as in Table 1, transmits an uplink resource allocation signal for new transmission or retransmission to the CB RA terminal within the predetermined time (the rescheduling window) according to whether the identification signal and the data are successfully received.

Accordingly, if the uplink resource allocation signal for new transmission or retransmission is not received from the base station within the predetermined time, that is, the rescheduling window, the CB RA terminal determines that the CB RA attempt has failed. Specifically, in the case of (C) or (D) in Table 1 or the case in which the CB RA terminal fails in receiving the uplink resource allocation signal for new transmission or retransmission from the base station, the CB RA terminal may determine that the CB RA attempt has failed.

When it is determined that the CB RA attempt has failed, the CB RA terminal may try to perform CB RA again or perform retransmitting of the data that is not transmitted due to the failure of the CB RA attempt through the CFA method.

Figure 7:
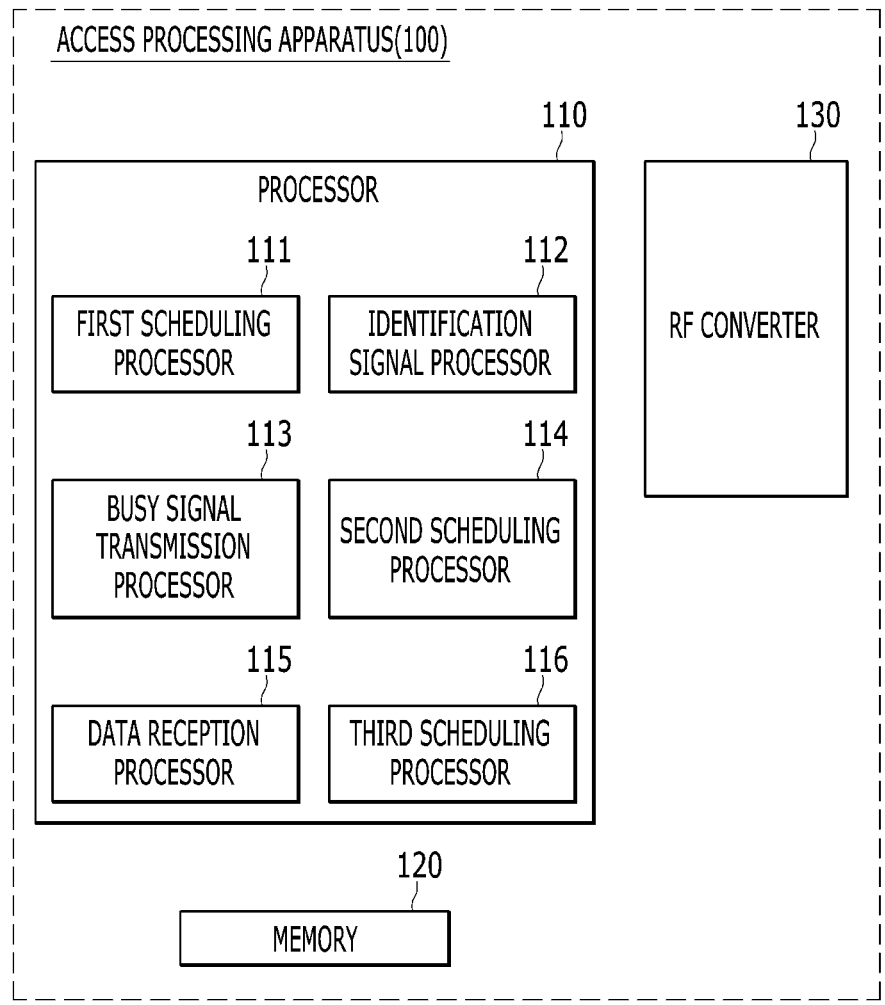
FIG. 7 shows a configuration diagram of an apparatus for processing access according to an exemplary embodiment of the present invention.

FIG. 7 shows a configuration diagram of an apparatus for processing access according to an exemplary embodiment of the present invention.

As shown in FIG. 7, an apparatus for processing access, that is, an access processing apparatus 100 according to an exemplary embodiment of the present invention, includes a processor 110, a memory 120, and a radio frequency (RF) converter 130. The processor 110 may be constructed to realize the methods described referring to FIG. 2 to FIG. 6.

For this purpose, the processor 110 includes a first scheduling processor 111, an identification signal processor 112, a busy signal transmission processor 113, a second scheduling processor 114, and a data reception processor 115, and further includes a third scheduling processor 116.

The first scheduling processor 111 performs scheduling for granting a resource to a terminal to transmit data in uplink with the CFA method, that is, a CFA terminal. The first scheduling processor 111 grants an uplink CB_RA resource to the CFA terminal and transmits uplink resource allocation information (UL grant) through a control channel.

The identification signal processor 112 receives an identification signal from a terminal to transmit data in uplink with the CB RA method, that is, a CB RA terminal, and decodes it to acquire the identification information of the CB RA terminal. The identification signal processor 112 stores the identification information. Here, the identification information may be a medium access control (MAC) address, a C-RNTI, or information on a code value when a terminal uses CDM for data transmission.

The busy signal transmission processor 113 broadcasts a busy signal in downlink in response to the reception of the CB RA identification signal.

The second scheduling processor 114 performs scheduling for granting an individual resource to the CB RA terminals when collision between data from the CB RA terminals occurs. Specifically, the second scheduling processor 114 grants a resource to each CB RA terminal with the CFA method and transmits information on the granted resource through a control channel such that each CB RA terminal transmits data through the granted individual resource when retransmitting data.

The data reception processor 115 receives and processes data transmitted from terminals.

The third scheduling processor 116 performs resource allocation according to whether the identification signal and data transmitted from the CB RA terminal are received. Specifically, the third scheduling processor 116 allocates an uplink resource for new transmission to the CB RA terminal when all of the identification signal and data are successfully received. Also, the third scheduling processor 116 allocates an uplink resource for retransmission to the CB RA terminal when only the identification signal is successfully received. The third scheduling processor 116 discards the received data when only the data is successfully received and does not take action when the reception of all of the identification signal and data has failed. By integrating the first to third scheduling processors, it may be referred to as "a scheduling processor".

The memory 120 is connected to a processor 110 and stores various information associated with an operation of the processor 110. The RF converter 130 is connected to the processor 110 and transmits or receives a wireless signal.

According to an exemplary embodiment of the present invention, it is possible to reduce delay time for random access when each terminal performs distributed random access.

Particularly, a long processing time required for a random access process and analyzing and determining a medium access control (MAC) message at a MAC layer may be avoided, and thereby the delay time (latency) that takes from the start of the random access process to the uplink data transmission can be reduced.

Also, the terminals using a contention-based access method and the terminals using a contention-free access method based on a base station's centralized scheduling share radio resources for random access, and thereby the underutilization of resources caused by the case of low contention-based access load is avoided.

The exemplary embodiment of the present invention described above is implemented not only by an apparatus and a method, but also by a program realizing a function corresponding to a configuration of the exemplary embodiment of the present invention or a recording medium recording the program. The above implementation may be achieved by a person of ordinary skill in the art based on the description of the above embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for random access by a first terminal in a wireless communication system, comprising:

transmitting, by the first terminal trying a contention-based random access (CB RA) before data transmission, a random access identification signal to a base station so that the base station broadcasts a busy signal in response to the random access identification signal, wherein the random access identification signal represents that the first terminal tries the random access using a resource shared between the first terminal and a second terminal trying a contention-free access (CFA); and transmitting, by the first terminal, data after transmitting the random access identification signal.

2. The method of claim 1, wherein the random access identification signal is orthogonal with random access identification signals transmitted from other terminals to try random access.

3. The method of claim 1, wherein
   the random access identification signal includes a different identification code from other terminals to try the random access, and
   the first terminal is provided with the identification code from the base station through signal exchange.

4. The method of claim 1, wherein the transmitting of data transmits data even though the busy signal is received from the base station, wherein the busy signal represents that a following radio resource will be used as a resource for CB RA.

5. The method of claim 4, wherein the first terminal acquires information on the CB RA resource through at least one among a method for acquiring the information through signal exchange with the base station and a method for acquiring the information from system information broadcasted from the base station.

6. The method of claim 1, further comprising,
   after the transmitting of data,
   determining that the random access has failed when an uplink resource allocation signal for new transmission or retransmission is not received from the base station during a predetermined time and trying retransmitting data.

7. A method for random access in a wireless communication system, comprising:

receiving, by a base station, a random access identification signal for a resource shared between a first terminal trying to a contention-based random access (CB RA) and a second terminal trying to a contention-free access (CFA), without data from the first terminal, wherein the random access identification signal represents that the first terminal tries random access;

transmitting, by the base station, a busy signal in response to the random access identification signal; and receiving, by the base station, data from the first terminal after receiving the random access identification signal.

8. The method of claim 7, wherein the busy signal represents that a following radio resource will be used as a resource for CB RA.

9. The method of claim 8, further comprising,
   before the receiving of a random access identification signal,
   performing, at a first time, scheduling for granting a CB RA radio resource that is a part of uplink resources at a second time after a predetermined interval has elapsed from the first time so that the first terminal and the second terminal share the CB RA radio resource.

10. The method of claim 8, further comprising,
    after the receiving of a random access identification signal,
    decoding the random access identification signal to acquire an identification code of the first terminal.

11. The method of claim 10, further comprising,
    after the receiving of data,
    if collision occurs when receiving data from two or more first terminals, identifying each of the first terminals based on identification codes and allocating a resource to each of the first terminals with the CFA method.

12. The method of claim 10, further comprising performing new transmission resource allocation or retransmission resource allocation according to whether the random access identification signal and the data are received, wherein the performing of new transmission resource allocation or retransmission resource allocation comprises:

allocating a new transmission uplink resource to inform of data reception success to the first terminal that is identified based on the identification code when all of the identification signal and the data are successfully received; and allocating a retransmission uplink resource to inform of data reception failure to the first terminal that is identified based on the identification code when the identification signal is successfully received and the reception of the data has failed.

13. The method of claim 12, further comprising informing a terminal of whether data is successfully received by using a flag representing that an allocated uplink resource is received by the new transmission resource allocation or the retransmission resource allocation.

14. The method of claim 13, wherein the informing informs of whether data is successfully received by using a new data indicator (NDI) flag.

15. The method of claim 14, wherein the informing comprises informing of whether data is successfully received within a predetermined time, wherein the predetermined time represents a time period defined as a rescheduling window.

16. An apparatus for processing random access in a wireless communication system, comprising:

a wireless frequency converter configured to transmit/receive a signal through an antenna; and a processor connected to the wireless frequency converter and configured to process random access, wherein the processor comprises:

an identification signal processor that receives a random access identification signal for a resource shared between a first terminal and a second terminal, without data from the first terminal, wherein the random access identification signal represents that the first terminal tries random access;

a busy signal transmission processor that transmits a busy signal in response to the random access identification signal; and a data reception processor that receives data from the first terminal after the identification signal processor receives the random access identification signal, wherein the first terminal is a terminal that tries to access with a contention-based random access (CB RA) method, the second terminal is a terminal that tries to access with a contention-free access (CFA) method, and the busy signal represents that a following radio resource will be used as a resource for CB RA.

17. The apparatus of claim 16, wherein the processor further comprises a first scheduling processor that performs, at a first time, scheduling for granting a CB RA radio resource that is a part of uplink resources at a second time after a predetermined interval has elapsed from the first time so that the first terminal and the second terminal share the CB RA radio resource.

18. The apparatus of claim 17, wherein the processor further comprises a second scheduling processor that identifies each of first terminals based on identification codes and allocates a resource to each of the first terminals with the CFA method if collision occurs when receiving data from two or more first terminals.

19. The apparatus of claim 18, wherein the processor further comprises a third scheduling processor that performs new transmission resource allocation or retransmission resource allocation according to whether the random access identification signal and the data are received, wherein the third scheduling processor informs of whether data is successfully received by using a flag representing that an allocated resource is received by the new transmission resource allocation or the retransmission resource allocation.

* * * * *